United States Patent [19]
Schmidt

[11] 3,906,995
[45] Sept. 23, 1975

[54] TANK CARS

[75] Inventor: Thomas W. Schmidt, Bartlesville, Okla.

[73] Assignee: Phillips Petroleum Company, Bartlesville, Okla.

[22] Filed: Aug. 14, 1974

[21] Appl. No.: 497,291

[52] U.S. Cl. .................. 137/575; 105/358; 141/35
[51] Int. Cl. ............................................. F17d 1/08
[58] Field of Search ............. 105/358, 360; 137/1, 571–575, 137/590, 592; 141/1, 35, 36, 98, 113, 231–233, 285, 325, 326, 392; 220/23.4

[56] References Cited
UNITED STATES PATENTS
3,675,670  7/1972  Ogawa ................................. 137/1
3,722,556  3/1973  Jeffers et al. .................... 141/113 X Primary Examiner—Richard E. Aegerter
Assistant Examiner—Frederick R. Schmidt

[57] ABSTRACT

Tank cars are constructed so as to permit a series of cars to be loaded and unloaded at a single location. Each car is provided with a standpipe or barrier to form a vertically extending compartment which is connected to the main body of the car by a valve. Conduit means are provided for connecting the compartment of one car with the main body of an adjacent car.

10 Claims, 4 Drawing Figures

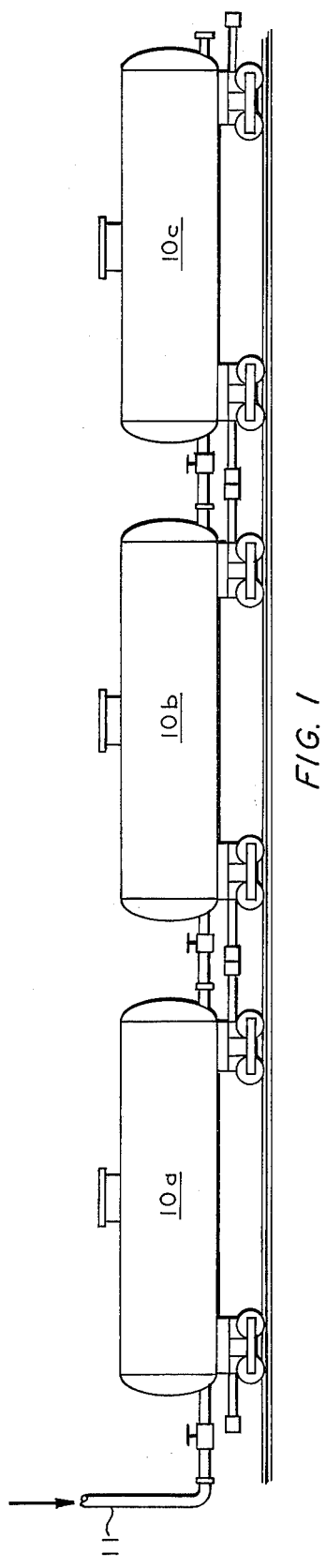
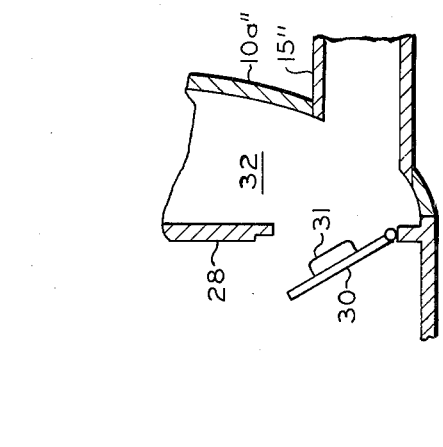
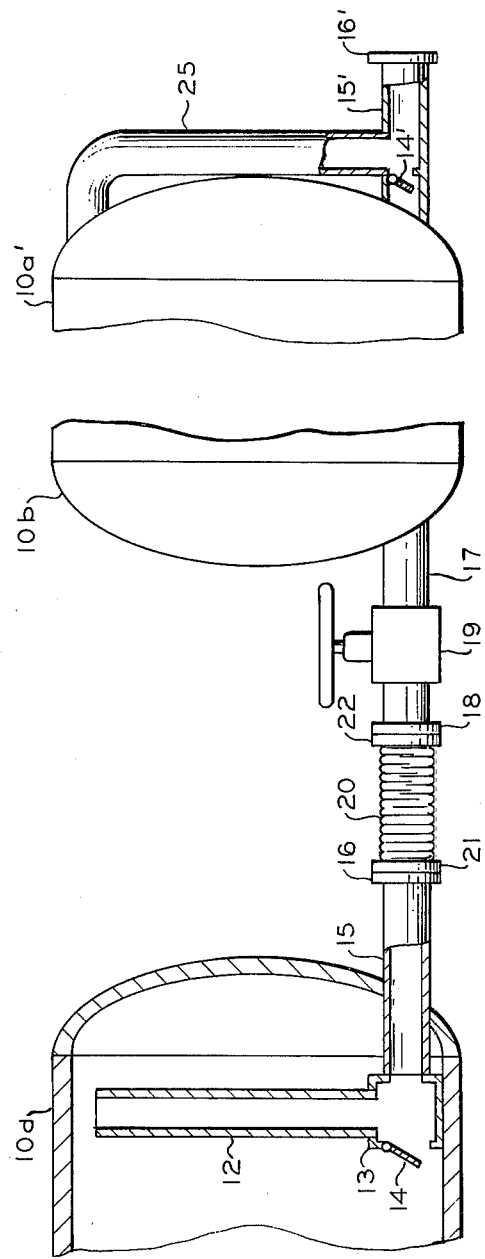

TANK CARS

The loading and unloading of a series of tank cars is a time-consuming operation because each car of the train normally must be moved in sequence to the loading and unloading equipment. While systems have been proposed which utilize compressed air to discharge liquid from a series of tanks at a common location, these systems are not always entirely satisfactory in operation, particularly if mixing or extended contact with air is detrimental to the liquid being transported.

In accordance with this invention, improved tank cars are provided which are of such configuration that a series of cars can readily be loaded and unloaded at a common location. The unloading can be accomplished by gravity draining. The cars are provided with a compartment, either internal or external, preferably located near the first end of each tank. The compartment is provided with a valve which is actuated in response to liquid level so that communication between the compartment and the main body of the tank is blocked during the normal filling operation. Open communication is provided during the unloading operation. The compartment of a first tank car is connected to the main body of a second tank car by external connections so that a series of tank cars can be connected together.

In the accompanying drawing,

FIG. 1 is a schematic representation of a series of tank cars constructed in accordance with this invention.

FIG. 2 is a view, shown partially in section, of a first embodiment of the filling and loading means of two of the tank cars of FIG. 1.

FIG. 3 is a view, shown partially in section, of a second embodiment of the compartment structure employed in this invention.

FIG. 4 is a partial view of a third embodiment of the tank car construction.

Referring now to the drawing in detail and to FIG. 1 in particular, there is shown a series of railway tank cars 10a, 10b and 10c which are connected together. Tank car 10a is connected to a filling conduit 11 which is connected to a source of liquid, not shown, to be transported. Although only three cars are illustrated, a larger number normally are connected in series.

The adjacent ends of tank cars 10a and 10b are illustrated in FIG. 2. A vertical standpipe 12 is mounted near the end of car 10a, such as by being attached to a housing 13 which rests on the bottom of the car. Housing 13 is provided with a valve 14 which connects the interior of the housing and the interior of tank car 10a. In the illustrated embodiment, this valve can be a swing valve which normally is closed by the force of gravity. If desired or necessary, an auxiliary spring can be employed to assist in retaining the valve in the normally closed position. A conduit 15 extends from housing 13 through the end of tank car 10a and is provided with a connecting flange 16 at its outer end.

A conduit 17 is connected to the end of tank car 10b and is provided with a connecting flange 18 at its outer end. A valve 19, which can be manually, pneumatically or electrically operated, for example, is positioned in conduit 17. A flexible conduit 20, which is provided with connecting flanges 21 and 22 at its two ends, extends between conduits 15 and 17 so that the interior of housing 13 and standpipe 12 are in communication with the interior of tank car 10b when valve 19 is open.

Each of the tank cars illustrated in FIG. 1 can be constructed in the manner illustrated in FIG. 2. A liquid to be transported is introduced into tank car 10a through conduit 11. Since valve 14 is closed when liquid is introduced, the liquid rises in tank car 10a until it enters standpipe 12. The head of liquid in car 10a assists in maintaining valve 14 closed. After tank car 10a is filled, the liquid overflows into standpipe 12 and flows through conduits 15 and 17 into tank car 10b. Tank car 10b then fills in the same manner until the liquid overflows into tank car 10c. Thus, the individual tank of the train can be filled in sequence at the common location from filling conduit 11.

All of the tank cars of the train can be emptied together at the destination, or the cars can be emptied individually if the valve 19 associated with each tank is closed. If all of the cars illustrated in FIG. 1 are to be emptied together, the valve 19 of tank car 10a is opened to permit discharge of the liquid from this car. Liquid flows by gravity from the interior of the tank, and from the interior of standpipe 12 when the head of liquid outside the standpipe is lowered sufficiently to permit valve 14 to open. Similarly, the liquid in the remaining tank cars empties through tank car 10a by flowing through conduit 15, housing 13 and valve 14. If possible, the track near the loading and unloading facilities should be on a slight incline to facilitate gravity flow from one car to the next.

A second embodiment of the tank car structure of this invention is illustrated in FIG. 3 wherein an external standpipe 25 is connected at its top and bottom to a tank car 10a'. A valve 14' is disposed in the bottom connection of the standpipe to the tank car. Standpipe 25 is also connected to a conduit 15' which terminates in a flange 16'. The external standpipe of FIG. 3 operates in the same manner as the internal standpipe 12 of FIG. 2. The external standpipe offers certain advantages in converting existing tank cars to tank cars which can be loaded and unloaded in accordance with this invention.

A third embodiment of the loading and unloading structure of this invention is illustrated in FIG. 4. A baffle 28 extends vertically adjacent the end of a tank car 10a''. A swinging valve 30, which has a float 31 attached thereto, is adapted to move into engagement with the lower end of baffle 28 to block communication between the main compartment of the tank and the region 32 between the baffle and the end of the tank. A conduit 15'' communicates with the end of tank 10a'' to permit connection to a second tank car. Valve 30 is moved to a closed position when the liquid level rises in the tank car during the filling operation. The top of baffle 28 is spaced downwardly from the top of tank 10a'' to permit liquid to overflow into region 32 and into the next car when tank car 10a'' is filled.

It is desirable to close valve 19 after the tank cars are filled in order to prevent the contents of the tank cars from being lost if the external connectors should be damaged. While a corresponding valve can be positioned in conduit 15, this valve is generally not necessary because the only liquid that could be lost in the event of an accident is the liquid within the standpipe or in space 32 of FIG. 4.

While this invention has been described in conjunction with presently preferred embodiments, it should be evident that it is not limited thereto.

What is claimed is:

1. A tank car comprising:
a tank adapted to contain a liquid to be transported, said tank having means associated therewith to form a vertically extending compartment which is in communication with the interior of the tank at the top of the compartment so that liquid filling the tank overflows into the compartment when the liquid level in the tank reaches a predetermined height;
valve means to establish communication between the bottom of the compartment and the bottom of the interior of the tank when the valve means is open and to block such communication when the valve means is closed, said valve means being moved to the closed position when liquid is placed in the interior of the tank and being moved to the open position when liquid is removed from the interior of the tank and liquid is present in the compartment; and
conduit means extending from the bottom of said compartment to a region exterior of said tank adjacent one end of the tank car.

2. The tank car of claim 1, further comprising second conduit means extending from the bottom of the interior of the tank to a region exterior of said tank adjacent the second end of the tank car.

3. The tank car of claim 2, further comprising a valve in said second conduit means exterior of the tank.

4. The tank car of claim 1 wherein said means to form a vertically extending compartment comprises a standpipe positioned within said tank.

5. The tank car of claim 1 wherein said means to form a vertically extending compartment comprises a standpipe positioned externally of said tank adjacent said one end of the tank car.

6. The tank car of claim 1 wherein said means to form a vertically extending compartment comprises a vertically extending baffle positioned within said tank spaced from and adjacent said one end of the tank car.

7. The tank car of claim 1 wherein said valve means comprises a float-actuated valve adapted to close when the liquid level rises in the interior of the tank.

8. The tank car of claim 1 wherein said valve means comprises a gravity-actuated valve which normally is closed, but which is opened when the pressure within said compartment exceeds the pressure within the interior of the tank outside the compartment.

9. Apparatus to transport liquids comprising:
first and second tank cars, each tank car including
  1 a tank adapted to contain a liquid to be transported, said tank having means associated therewith to form a vertically extending compartment which is in communication with the interior of the tank at the top of the compartment so that liquid filling the tank overflows into the compartment when the liquid level in the tank reaches a predetermined height,
  2 valve means to establish communication between the bottom of the compartment and the bottom of the interior of the tank when the valve means is open and to block such communication when the valve means is closed, said valve means being moved to the closed position when liquid is placed in the interior of the tank and being moved to the open position when liquid is removed from the interior of the tank and liquid is present in the compartment,
  3 first conduit means extending from the bottom of said compartment to a region exterior of said tank adjacent one end of the tank car, and
  4 second conduit means extending from the bottom of the interior of the tank to a region exterior of said tank adjacent the second end of the tank car; and
b flexible coupling means connecting the first conduit means of the first tank car to the second conduit means of the second tank car.

10. The apparatus of claim 9, further comprising a valve in the second conduit means of each of said tank cars exterior of the tank.

* * * * *